United States Patent [19]

Castera et al.

[11] Patent Number: 5,167,062
[45] Date of Patent: Dec. 1, 1992

[54] METHOD OF MANUFACTURING MAGNETIC WRITE/READ HEAD AND FABRICATION METHOD

[75] Inventors: Jean-Paul Castera, Chevreuse; Jean-Marc Coutellier, Maurepas, both of France

[73] Assignee: Thomson-CSF, Puteaux, France

[21] Appl. No.: 681,062

[22] Filed: Apr. 5, 1991

[30] Foreign Application Priority Data

Apr. 13, 1990 [FR] France ................. 90 04811

[51] Int. Cl.⁵ .................................... G11B 5/42
[52] U.S. Cl. ........................... 29/603; 360/119; 360/122
[58] Field of Search ............ 29/603; 360/119–122, 360/125–127

[56] References Cited

U.S. PATENT DOCUMENTS

| | | |
|---|---|---|
| 4,399,479 | 8/1983 | Meckel ............... 360/122 X |
| 4,601,099 | 7/1986 | Nishiyama . |
| 5,042,140 | 8/1991 | Coutellier et al. ........... 29/603 |

FOREIGN PATENT DOCUMENTS

| | | |
|---|---|---|
| 0152064 | 8/1985 | European Pat. Off. . |
| 0216114 | 4/1987 | European Pat. Off. . |
| 64-13207 | 1/1989 | Japan . |

OTHER PUBLICATIONS

Patent Abstracts of Japan, vol. 14, No. 158 (P-1027) (4101), Mar. 27, 1990; & JP-A-02 014411, Jan. 18, 1990.
Patent Abstracts of Japan, vol. 11, No. 147 (P-575) (2594), May 14, 1987, & JP-A-61 283018, Dec. 13, 1986.
Patent Abstracts of Japan, vol. 11, No. 305 (P-623) (2752), Oct. 6, 1987, & JP-A-62 097118, May 6, 1987.
IBM Technical Disclosure Bulletin, vol. 21, No. 12, May 1979, p. 5002; K. E. Peterson, "Thin Film Magnetic Heads".

Primary Examiner—Carl E. Hall
Attorney, Agent, or Firm—Oblon, Spivak, McClelland, Maier & Neustadt

[57] ABSTRACT

Disclosed is a magnetic head comprising chiefly two thin or thick layers of magnetic materials located in a same plane and separated by a gap layer of non-magnetic material, also made in the form of a thin or thick layer. This gap layer forms a determined angle with the plane of the layers of magnetic materials. Methods are also provided for the making of such a head. In particular, these methods make it possible to determine, with precision, the angle of the gap with the plane of the layers of magnetic materials. Applications: magnetic write/read heads for computer peripherals (using tapes or disks), and possibly video tape recorders.

22 Claims, 7 Drawing Sheets

SECTION a-a

SECTION b-b

METHOD OF MANUFACTURING MAGNETIC WRITE/READ HEAD AND FABRICATION METHOD

BACKGROUND OF THE INVENTION

1. Field of the Invention

The invention relates to a magnetic write/read head and to methods for the fabrication of such a head. More particularly, the invention can be applied to the technique of read/write magnetic heads for the technically very advanced magnetic disks and/or tapes used in computer peripherals for writing and reading operations on magnetic tapes and disks. It could also be applied to other types of equipment such as tape recorders and video recorders.

2. Description of the Prior Art

At present, the rotating magnetic write/read heads use a "bulk" type of technology (that is, a non-integrated technology). This technology involves delicate steps for the polishing and bonding of the poles. The increase in the density of writing on the new media has made it necessary to have write heads that perform better.

To enable the writing of increasingly smaller pieces of information on magnetic tapes, the coercivity of these tapes has to be increased. In particular, to record a high definition digital video signal, it is estimated that the dimensions of the elementary bit will be close to 0.2 $\mu$m (in the running direction of the tape) per 5 $\mu$m (width of the track). The EM (evaporated metal) tape is presently the most promising candidate for achieving performance levels of this kind: its coercivity is close to 1000 oersteds.

Magnetic tapes too need to undergo development. In particular, the zone liable to be saturated, in the vicinity of the gap, should be constituted by a material with a level of magnetization at saturation that is far higher than that of the ferrites typically used ($4\pi Ms=5000$ Gauss: empirically, it is known that, typically, seven times the coercivity of the tape, i.e. 7000 Gauss in this example, needs to be attained in the gap for accurate writing.

These requirements have complicated the technology used to make these components.

New structures of heads have therefore appeared in the market. Their main characteristics are given here below:

Metal-In-Gap (MIG) type heads in which the body is composed of an Mn-Zn ferrite with high permeability, and the poles are coated with a layer of sendust (an alloy of iron, aluminium and silicium). An intermediate magnetic "matching" layer is provided between each pole and the sendust layer that covers it so as to reduce the secondary gap phenomenon and preserve a sendust/ferrite interface parallel to the main gap. The technology used to make these components could have been simplified to the point of becoming very similar to the well-known technology of ferrite heads. The presence of a pseudo-gap at the interface between the sendust and the ferrite has made it necessary to modify the structure of this head and has given rise to the following heads.

TSS (tilted sputtered sendust) type heads which are far more sophisticated than the preceding ones. In these TSS heads, the main body of the head is made of ferrite, but the poles are constituted by a magnetic material with high magnetization at saturation (sendust: $44\pi Ms$: 12000 Gauss). The sendust/ferrite interface also behaves like a small-sized gap. It is therefore necessary to incline it with respect to the useful gap so that no destructive interference on the reading signal is obtained. This constraint leads to a very complicated fabrication technology, hence one that is very costly, and to output efficiency levels that are difficult to control.

MIG heads wherein the problem of the pseudo-gap is resolved by the interposition, between the sendust and the ferrite material, of a matching layer making it possible to prevent destructive interferences from affecting the reading signal.

However, these heads are limited in frequency (due to the ferrite body and the eddy current in the sendust), and their bulk type technology is ill-suited to narrow tracks.

Indeed, these above-mentioned structures are ill-suited to the high frequencies of the high-definition digital signals at which it is necessary to work:

the standard ferrite structure used has an excessively low cut-off frequency;

eddy currents develop in the sendust which is not sufficiently resistive, and its magnetic permeability falls sharply. The relative directions of the field and of the plane of deposition of these materials unfortunately does not allow for the lamination of the sendust in order to reduce the currents induced.

A third type of head, the laminated head, has therefore been recently designed:

LTFH (laminated thin film head): this head is constituted by a stack of thin films with high magnetization uncoupled from one another by one or more fine non-magnetic layers to prevent the eddy currents from developing. The total thickness of the stack defines the width of the track written on. The width of the gap is defined by the thickness of the non-magnetic layer between the two parts of the head.

The absence of a ferrite body and the deposition of magnetic layers that perform well in a plane parallel to the tracks written on, firstly, enables use at high frequency and, secondly, is well suited to narrow writing tracks. By contrast, the making of the gap by the same method as the "bulk" method eliminates this latter advantage and converts even this potential advantage of the thin layers into a major disadvantage. Indeed, especially for small track widths, it is very difficult to accurately align the two parts constituting such a head and, hence, to position the magnetic poles so that they face each other precisely. Finally, this technology requires a final individual processing (rounding) operation on the heads, and therefore entails a high fabrication cost.

The above-described technologies require a processing of the heads in strips, up to the final rounding of each head which is done first of all on a strip, and then head by head. Our proposal enables a batch processing operation (two-dimensional substrate) up to the final rounding operation.

The object of the present invention consists in resolving this problem and in making full use of the advantages related to the deposition of thin layers, these advantages being the batch procedure and the perfect matching with the narrow tracks. In particular, the invention enables an extremely precise automatic alignment of the magnetic poles. Besides, all the characteristics of the last type of structure presented are preserved.

SUMMARY OF THE INVENTION

The invention therefore concerns a magnetic write/read head including a first support layer made of a non-magnetic material having a main face and bearing, on this main face, two layers made of magnetic materials in the form of thin or thick layers separated by a gap layer made of a non-magnetic material in the form of a thin or thick layer, this gap layer forming a determined angle with the main face, a hole going through the first support layer and the two layers of magnetic materials so as to be secant with the gap layer.

The invention also concerns a method for the making of a magnetic write/read head comprising the following steps:

a) the making of a monocrystalline substrate having a main face oriented along a determined angle with respect to a crystallographic axis <100> of the monocrystalline substrate;

b) the making of a mask on a part of the main face;

c) the selective chemical attacking of the main face of the substrate;

d) the deposition of a gap layer made of a non-magnetic material;

e) the deposition of a first layer of a magnetic material;

f) the machining of the first layer of magnetic material and, as the case may be, of the layer of non-magnetic material so as to obtain a plane surface;

g) the bonding of a first support layer made of non-magnetic material;

h) the removal of the remaining monocrystalline substrate;

i) the deposition of a first layer of a magnetic material on the face of the structure left free by the removal of the monocrystalline substrate ) the drilling of a hole creating an interruption in the gap layer made of non-magnetic material.

The invention also concerns another method for the making of a magnetic write/read head comprising the following steps:

a) the making of a monocrystalline substrate having a main face oriented along a determined angle with respect to a crystallographic axis <100> of the monocrystalline substrate;

b) the making of a mask on a part of the main face;

c) the selective chemical attacking of the main face of the substrate;

d) the deposition of a first layer of a magnetic material;

e) the deposition of a gap layer made of a non-magnetic material;

f) the deposition of a second layer of a magnetic material;

g) the machining of the second layer so as to obtain a plane surface;

h) the bonding of a first support layer to the first surface;

i) the removal of the monocrystalline substrate;

j) the drilling of a hole so as to create an interruption in the gap layer.

BRIEF DESCRIPTION OF THE DRAWINGS

The different objects and features of the invention shall appear from the following description and from the appended drawings, of which:

FIGS. 14 to 19 show different steps of a

DETAILED DESCRIPTION OF THE INVENTION

Referring to FIGS. 1 to 13, we shall first of all describe a first method for the fabrication of a magnetic write/read head according to the invention.

To carry out this method, there is a substrate 1 made of a crystalline material having a face 10 oriented along a determined angle in relation to a crystallographic axis of the substrate. The substrate is, for example, crystalline silicon and the crystallographic axis is <100>.

Figure 1:
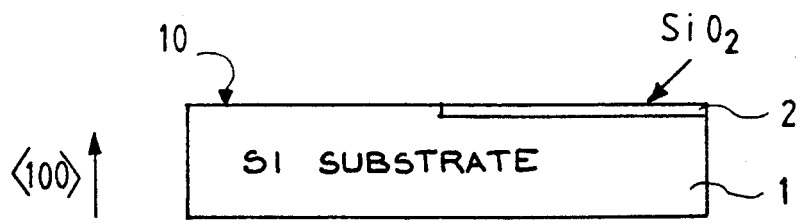
FIGS. 1 to 13 show different steps of a fabrication method according to the invention.

A mask 2 is made on the face 10 of the substrate. This mask 2 protects a part of the face 10 (FIG. 1). For example, if the substrate is made of silicon, the mask 2 is made by the deposition of a material insensitive to a silicon-attacking solution. Preferably, the mask is then $SiO_2$ obtained by a thermal oxidation of silicon on the substrate 1.

During a following step, the face 10 is subjected to chemical attack by means of a product that does not attack the mask. According to the example taken, namely that of the silicon substrate and of the $SiO_2$ mask, the attack solution will be a solution of:

$$NaOH + isopropanol + H_2O$$

The chemical attack will be carried out along the crystallographic orientation of the substrate.

If the face 10 of the silicon substrate is oriented perpendicularly to the axis <100>, the chemical attack will take place along a plane forming an angle of 54.75° with the normal to the face 10.

Figure 2:
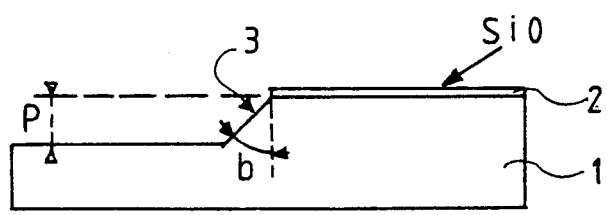
Figure 3:
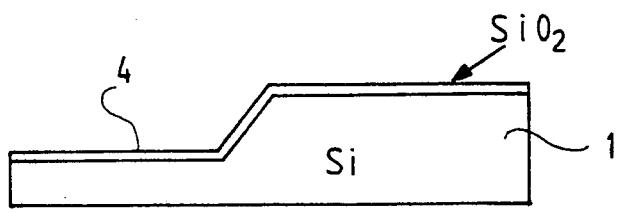

As shown in FIG. 2, there will therefore be a face 3 that will form an angle b (54.75° for example) with the normal to the face 10.

The etching depth p of the substrate should correspond substantially to the width of the magnetic poles of the magnetic head to be obtained (the width of the active part of the head). For example, this depth p is about five micrometers.

During the next step (FIG. 3), a layer 4 of a non-magnetic material is deposited. This layer 4 will serve as a gap material for the magnetic head. This layer may be obtained either by deposition (of $Al_2O_3$, $SiO_3$, etc.) or by oxidation, notably in the case of silicon, by thermal oxidation which leads to a layer of $SiO_2$.

Figure 4:
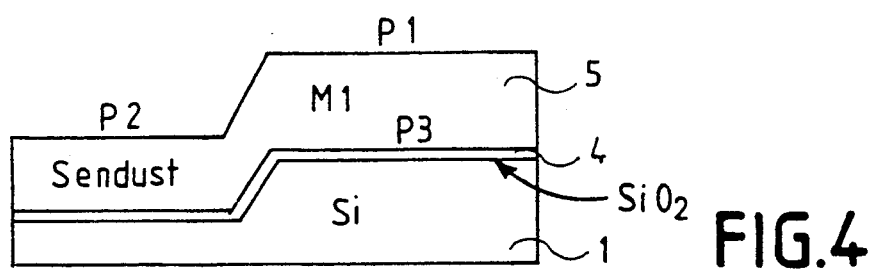

Then, as shown in FIG. 4, a layer 5 of a magnetic material is made, namely a material that has high permeability and high magnetization at saturation. This material is, for example, sendust which is an alloy of iron, aluminium and silicon having high magnetic permeability. The thickness of this layer is in the same order of magnitude as the depth p of the previous etching.

The structure obtained then has a zone P1 with an extra thickness as compared with the zone P2.

The extra thick zone of the layer 5 is then removed, for example by polishing. If the thickness of the layer 5 is smaller than the height of the step of the substrate (the depth p), the polishing stops at the upper level of the zone P2 and the layer 4 of the zone P3 is removed. If the thickness of the layer 5 is greater than the depth p, the polishing is done up to the layer 4 of the zone P3. In this case, the layer 4 may or may not be removed.

Figure 5:
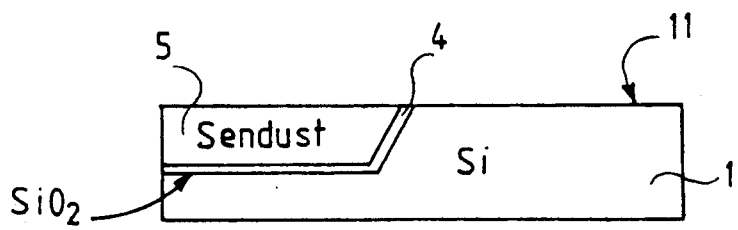

Thus, the structure of FIG. 5, having a face 11, is obtained.

Figure 6:
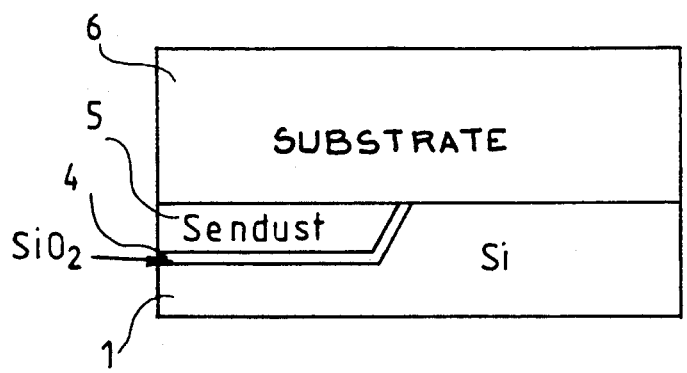
Figure 7:
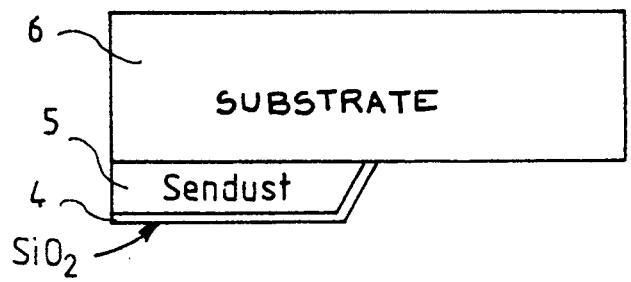

During the next step, the face 11 is associated with a substrate or support layer 6. For example, the substrate is glass, bonded to the face 10. One variant would consist in depositing a substantial thickness (15 $\mu$m–30 $\mu$m) of a non-magnetic material ($SiO_3$, $Al_2O_3$, ...), for example by sputtering. The structure of FIG. 6 is obtained Then the substrate 1 is removed by isotropic chemical attack for example (FIG. 7).

Figure 8:
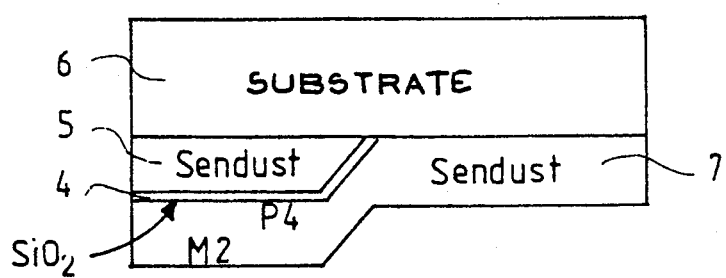

As is shown in FIG. 8, a second layer 7 of material having high magnetic permeability, for example sendust, is deposited on the face of the substrate 6 comprising the layers 4 and 5. The thickness of this layer 7 is substantially equivalent to the thickness of the previously deposited layer 5 of magnetic material, that is, about five micrometers.

Figure 9:
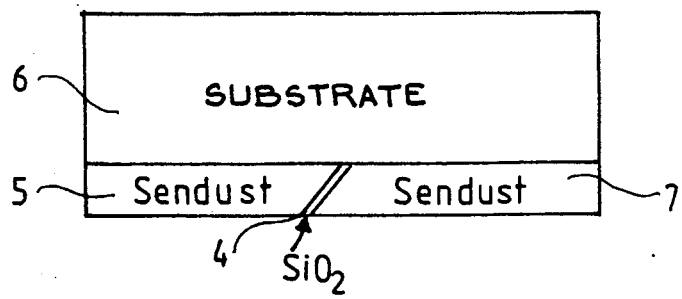
Figure 10:
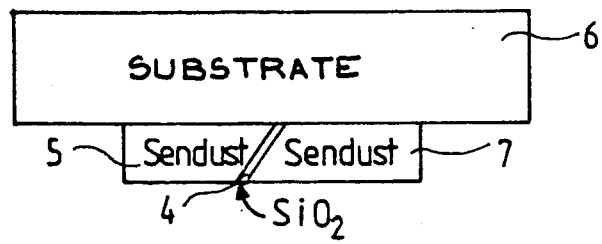

Then the extra thick zone M2 is removed, for example by polishing. In this case too, it is possible, depending on the thickness of M2, to preserve or not preserve the plane P4 of the $SiO_2$ layer 4. Thus, the structure of FIG. 9 is obtained.

During the next step (FIG. 10), the magnetic head is machined so that it is given a determined shape. Furthermore, a hole 9 is made perpendicularly to the plane of the layer so that this hole interrupts the gap layer 4.

Figure 11:
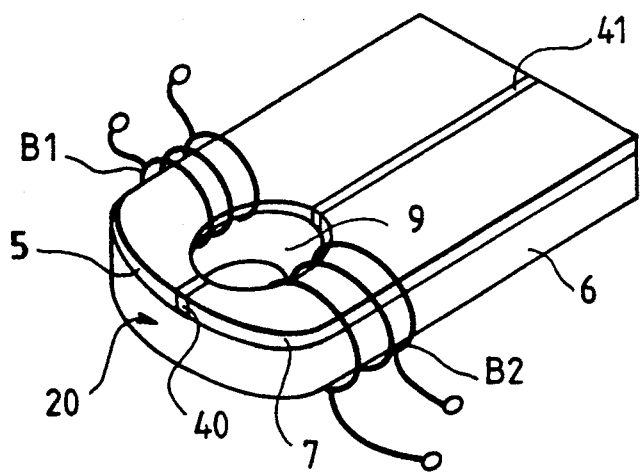

For example, a head such as the one shown in FIG. 11 is obtained. In this embodiment, the substrate 6 and the layers 5 and 7 are machined at the same time. A curved surface 20, flush with the gap layer 40, constitutes the active surface of the magnetic head which will be in contact with the writing medium (magnetic tape). The hole 9 interrupts the layer 4. Coils B1 and B2 have been wound through the hole 9 around the layers 5 and 6. The magnetic flux emitted by the coils gets closed up by a writing medium (not shown) placed in the vicinity of the active surface 20 and will go through the gap 41 which, owing to its length, will not constitute a gap that hampers the working of the magnetic head.

Figure 12:
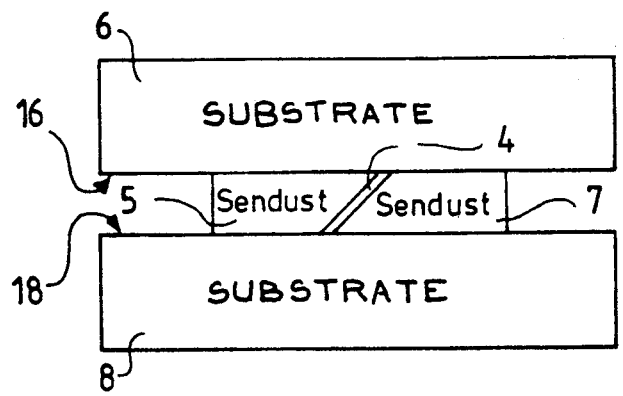

As is shown in FIG. 12, a second substrate 8 (or support layer) may be placed on the side opposite the substrate 6 in relation to the magnetic layers 5 and 7. The magnetic layers 5 and 7 and the gap 4 are thus sandwiched between the faces 16 and 18 of the two supporting parts 6 and 8, thus enabling these magnetic layers and the gap to be protected and the solidity of the head to be improved. This substrate 8 may be made like the substrate 6.

Figure 13:
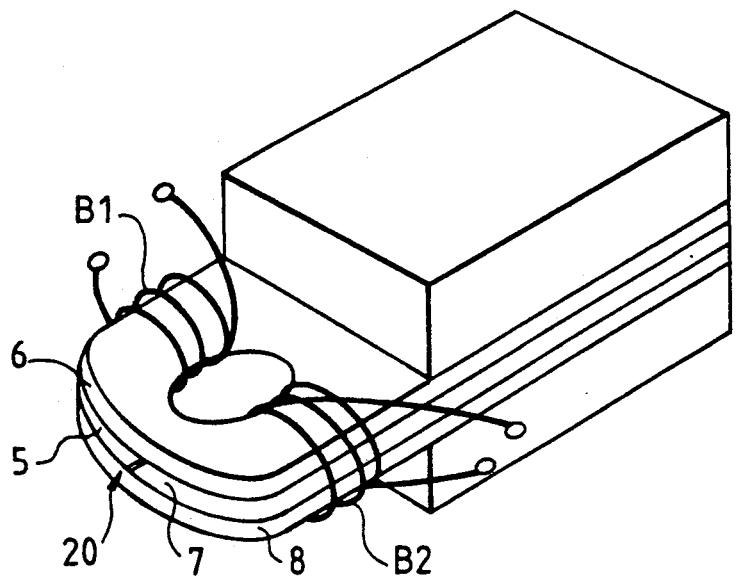

According to one alternative embodiment of the invention, should the attached layers 6 and 8 be layers of non-magnetic material, with a thickness ranging from 15 to 30 $\mu$m, supports could be bonded, for example with glass, on either side so as to make it possible to handle the heads thus made. It could be seen to it (although this is not indispensable) that the edge of these supports is at a distance of at least several tens of $\mu$m from that part of the head which is in contact with the tape, as is shown in FIG. 13.

For the winding of the heads, one variant would consist in making an integrated coil.

Figure 20:
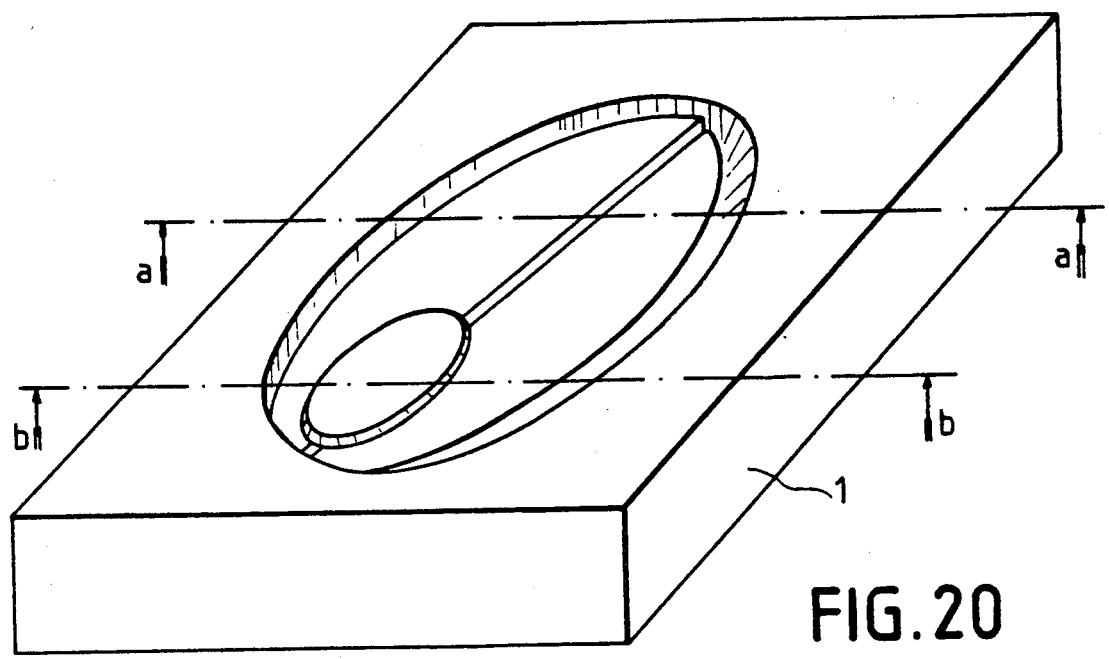
FIGS. 20 to 22 show an alternative embodiment of the fabrication method of FIGS. 14 to 19.
Figure 21:
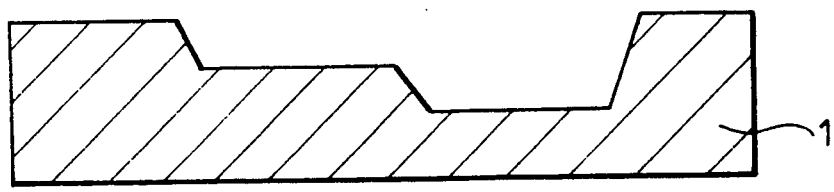
Figure 22:
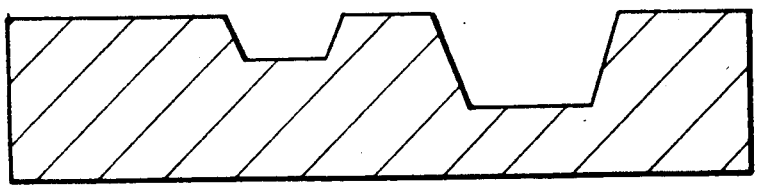

The step for etching the shape of the poles may be avoided by overlaying this shape in the initially prepared silicon substrate, as is shown in FIGS. 20 to 22.

A fabrication method such as this has the following advantages:

total control over the azimuth and the making of a gap that is perfect because it is defined directly on the silicon step. The dimensions of the gap are strictly controlled and the quality of the flanks is that of the inclined plane made of silicon. In this fabrication method, the perfection of the gap is independent of the depth of the silicon step. This technology is therefore well suited to any width of writing track.

a deposition of the layers of magnetic material on the same material ($SiO_2$) under strictly identical conditions (azimuth angle at the gap). In the present case, the second magnetic does not have suffer from the defects, if any, of the first layer.

Referring to FIGS. 14 to 19, we shall now describe another method of the invention.

Figure 14:
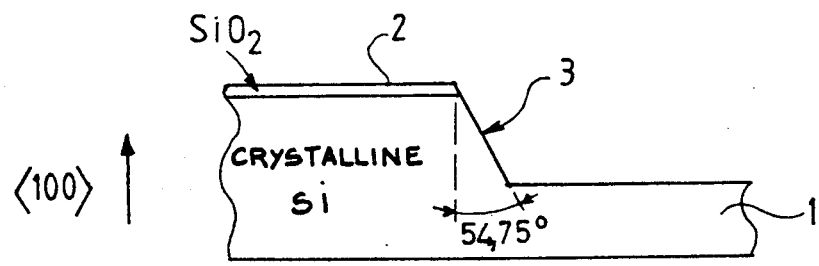

As earlier, there is a wafer of a suitably oriented monocrystalline substrate. For example, a <100>oriented monocrystalline silicon wafer has planes of resistance to chemical attack by a solution of NaOH +isopropanol+water, these planes of resistance being oriented by an angle of 54.75°. It is therefore possible to obtain facets that are perfectly defined by the masking of a part of the substrate 1 with a mask 2 and then by chemical attack (FIG. 14). A facet 3 is obtained. This facet 3 forms a determined angle (54.75° for example) with the normal to the face of the substrate.

An adapted disorientation of the crystallographic axis of the wafer would lead to a facet that forms a different angle with the surface. Thus, a wide range of angles may be obtained.

Layers of magnetic or non-magnetic material may be deposited on the surface of this etched substrate. They may perfectly fit and reproduce the shape of the substrate.

Figure 15:
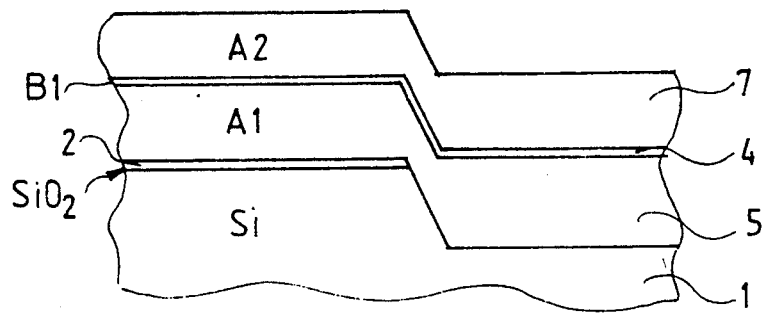

According to the invention, therefore, as shown in FIG. 15, the following layers are deposited successively:

a layer 5 of magnetic material A1, formed by sendust with a typical thickness of 5 $\mu$m for example;

a layer 4 of non-magnetic material B1, formed by alumina $Al_2O_3$ with a typical thickness of 0.2 $\mu$m for example;

a layer 7 of magnetic material A2, formed by sendust with a typical thickness of 5 $\mu$m for example.

The successive deposition of the three layers in the same stand enables all sources of external contamination to be avoided.

Figure 16:
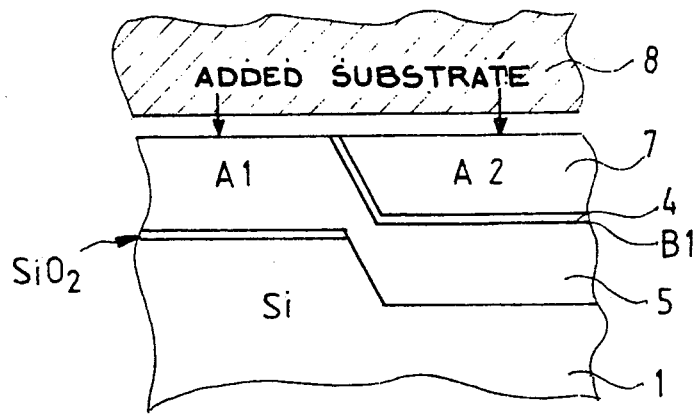

The zones forming an extra thickness on the layer A2 are removed, for example by polishing, then a non-magnetic plane substrate 8 is bonded, for example with glass, to the surface that has been thus polished (FIG. 16).

Figure 17:
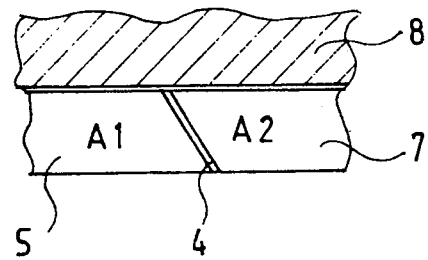

The original silicon substrate 1 is then removed, for example by isotropic chemical attack or by adapted mechanical means, as is the projecting part of the layer 5 of magnetic material A1. Thus, the structure of FIG. 17 is obtained.

Figure 18:
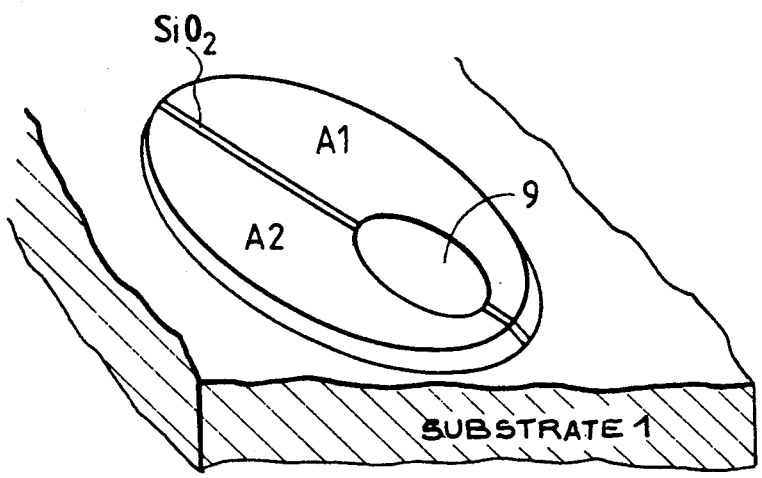

The upper face is then etched, as shown in figure 18, so as to define the final shape of the structure to be obtained. It is possible, for example, to use the technique of ion etching through a previously positioned mask.

Finally, a second non-magnetic, plane substrate 8' is bonded to this cleared surface. All that remains to be done then is to drill the holes through which the wires of the coils will be passed, make individual heads out of this substrate and round the surfaces in contact with the tape to obtain a magnetic head like the one shown in FIG. 19.

According to one variant, the monocrystalline substrate 1 during the first step is subjected to an ion etching operation so that the shape of the head is formed as a hollow in the substrate 1 (FIGS. 20 to 22). The steps of the method are then those described here above. The poles are then overlaid in this monocrystalline substrate, and there is therefore no etching of the poles to be done.

Figure 23:
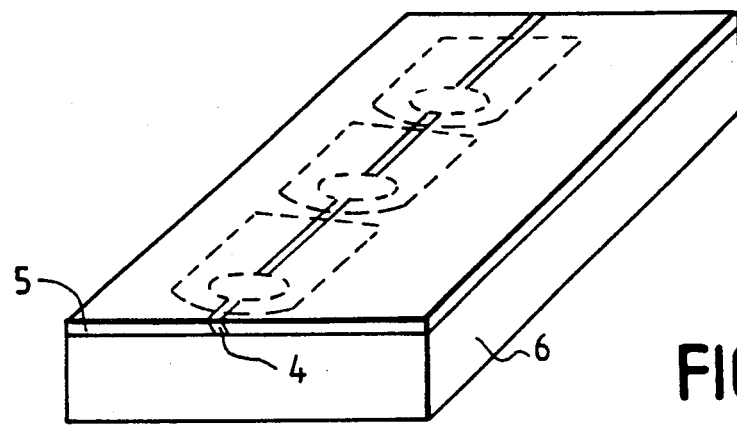
FIGS. 23 to 24 show an exemplary method for the batch fabrication of the magnetic heads.

As has been described here above with reference to FIG. 23, one or more coils may be integrated into the magnetic head.

A fabrication method such as this has the following advantages:

the track width is defined by the height of the step etched in the silicon, provided that the thickness of the deposited magnetic layers is at least equal to it.

the azimuth angle of the gap made is defined by the selective attacking of the monocrystal used as a support.

the width of the gap is defined with precision by the thickness of the non-magnetic layer B1 deposited.

the step for etching the shape of the poles can be eliminated by overlaying this shape on the properly prepared silicon substrate.

Figure 19:
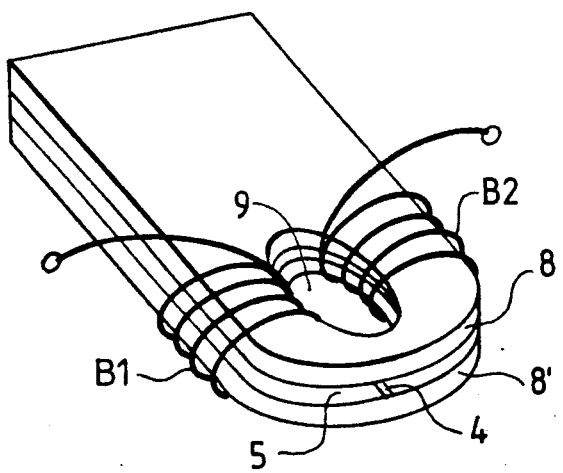

The invention therefore also concerns a magnetic head such as the one shown in FIGS. 11 and 19. A head such as this has the following on a substrate 6 (FIG. 11): two layers 5 and 7 made of magnetic materials (with high permeability and high magnetization at saturation), in the form of thin or thick layers separated by a layer 4 made of a non-magnetic material that is also in the form of a thin or thick layer. The layer 4 (referenced 40 and 41 in FIG. 11) forms a determined angle with the normal to the plane of the layers 5 and 7. A hole 9 separates the layer 4 into two parts 40 and 41. The hole 9 enables the winding of the magnetic field induction coils B1 and B2.

As is shown in FIG. 19, the layers 5 and 7 And the layer of non-magnetic material 4 (gap layer) may be sandwiched between two layers of substrates 8 and 8'.

This type of method for the fabrication of magnetic heads can be applied to magnetic heads for computer applications (hard disks, tapes etc.).

It can also be applied to other types of magnetic heads such as:

video magnetic heads, especially for the recording of HDTV digital signals;

multiple-track heads and, generally, any type of single or multiple magnetic head for large-scale consumption, professional or military applications.

In the different methods described here above, it is also possible to laminate the layers 5, 7 of magnetic materials by providing for an alternating deposition of magnetic materials and insulator materials, the purpose of this being to prevent the development of eddy currents.

Finally, according to another alternative fabrication method of the invention, one of the layers attached to the layers 5 and 7 or the two layers (6, 8, 8') has a part made of a magnetic material located on the part 41 of the gap layer. The gap part 41 is thus magnetically short-circuited.

In order that this magnetic short-circuit may be effective, the fabrication methods then provide for the making of the substrate layer or layers (6, 8, 8') by the successive deposition of two materials, one non-magnetic on the gap part 40 side and the other magnetic on the gap part 41 side.

Figure 24:
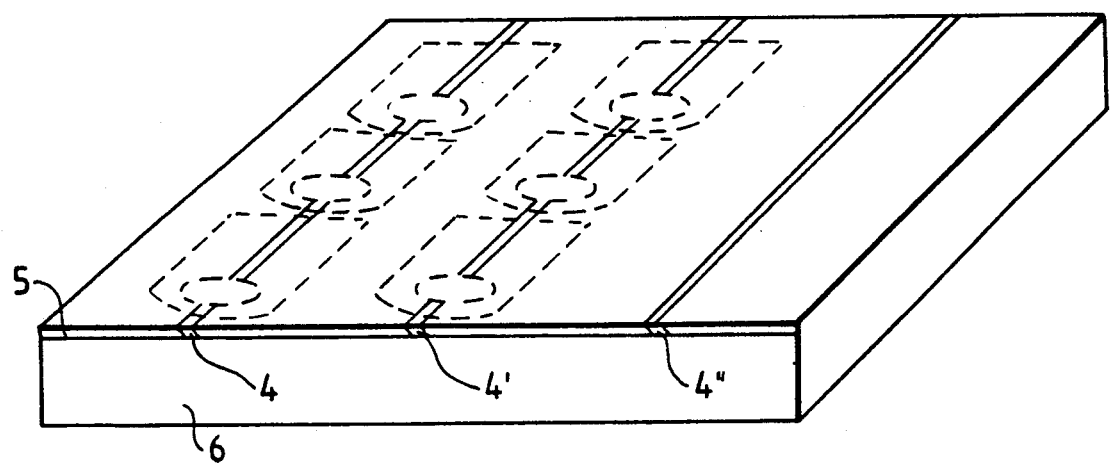

The invention also enables a batch fabrication of the heads. In this case, the fabrication method described in relation to FIGS. 1 to 9 is carried out and then, as is shown in FIG. 23, several magnetic heads are cut out along the gap layer 4. It is quite clear that the method of the invention enables the making of several gap layers 4, 4', 4", parallel and cut out as shown in FIG. 24 and the subsequent cutting out of several magnetic heads along each gap layer.

It may be added that the cutting out of the magnetic heads that has just been described may be done after a second substrate 8 has been fabricated, as is shown in FIG. 16, to improve the solidity of the magnetic heads.

What is claimed is:

1. A method for making a magnetic write/read head comprising:
   (a) providing a monocrystalline substrate having a main face oriented along a predetermined angle with respect to a crystallographic axis of the monocrystalline substrate;
   (b) forming a mask on apart o the main face;
   (c) selectively chemically attacking the main face of the mono crystalline substrate;
   (d) depositing a gap layer of a non-magnetic material on at least a portion of the substrate subjected to chemical attack;
   (e) depositing a first layer of a magnetic material on said gap layer;
   (f) machining the first layer of a magnetic material to form a substantially planar surface;
   (g) bonding a first support layer of a non-magnetic material to the substantially planar surface;
   (h) removing remaining portions of said monocrystalline substrate;
   (i) depositing a second layer of a magnetic material on a face left free after removal of the monocrystalline substrate; and
   (j) drilling a hole through said first support layer, said first and second layers of magnetic materials and said gap layer at a location where said first and second layers of magnetic materials are separated by said gap layer such that an interruption if formed in said gap layer;
   wherein a magnetic write/read head is provided having first and second layers of magnetic materials extending along the first support layer and separated by the gap layer such that an active surface o the magnetic write-read head includes thickness dimensions of said first and second layers of magnetic materials.

2. The method of claim 1, wherein said step of machining the first layer includes removing a portion of the gap layer of a non-magnetic material.

3. The method of claim 1, further including winding at least one coil through said hole to form a magnetic-field induction coil for the write/read head, such that the coil is wound through said hole and around a layer of magnetic material.

4. The method of claim 1, further including a second machining step after the step of depositing said second layer of magnetic material, said second machining step including machining the second layer of magnetic material to form a second substantially planar surface.

5. The method of claim 4, further including bonding a second support layer to said second substantially planar surface formed in the second machining step such that the first and second layers of magnetic materials and the gap layer are sandwiched between the first and second support layers.

6. The method of claim 1, wherein the step of providing a monocrystalline substrate includes providing a substrate comprising silicon.

7. The method of claim 1, wherein the step of depositing the first and second layers of magnetic materials includes depositing layer of alloys comprising ron, aluminum, and silicon.

8. The method of claim 1, wherein step of depositing a gap layer includes depositing a layer comprising silicon oxide.

9. The method of claim 1, further including forming a plurality of magnetic heads extending in a lengthwise direction of the gap layer, and wherein the plurality of heads can be machined in a same machining operation.

10. The method of claim 1, further including forming a plurality of magnetic heads have gap layers extending parallel to one another.

11. The method of claim 1, wherein the step of selectively chemically attacking includes forming an inclined face of a portion of the monocrystalline substrate not covered by said made, and wherein the gap layer is formed on the inclined face during the gap layer deposition step, with the gap layer formed on the inclined face forming the gap layer separating the tow layers of magnetic materials in the finished head.

12. The method for making a magnetic write/read head comprising:
(a) providing a monocrystalline substrate having a main face oriented along a determined angle with respect to a crystallographic axis of the monocrystalline substrate;
(b) forming a mask on a part of the main face o the substrate;
(c) selectively chemically attacking said main face of the monocrystalline substrate;
(d) depositing a first layer of a magnetic material on at lest a potion of the substrate which was subjected to chemical attack;
(e) depositing a gap layer of a non-magnetic material on said first layer of magnetic material;
(f) depositing a second layer of a magnetic material on said gap layer;
(g) machining said second layer of magnetic material to form a substantially planar surface;
(h) bonding a first support layer o the substantially planar surface;
(i) removing the monocrystalline substrate;
(j) drilling a hole through said first and second layers of magnetic materials and said gap layer at a location where said first and second layers are separated by said gap layer such that an interruption is formed in said gap layer;
wherein a magnetic write/read head is provided having two layers of magnetic materials extending along said first support layer and separated by a gap layer such that an active surface of the magnetic head includes thickness dimensions of said two layers of magnetic material.

13. The method of claim 12, wherein the step of machining the second layer of magnetic material includes removing a portion of the ga layer of non-magnetic materials.

14. The method of claim 12, further including winding at least one coil through said hole to form a magnetic-field induction coil for the write-read head, with said coil wound through said hole and around a layer of magnetic material.

15. The method of claim 12, further including a second matching step after the step of removing the monocrystalline substrate, said second machining step including machining the first layer of magnetic material to form a second substantially planar surface.

16. The method of claim 15, further including bonding a second support layer to said second substantially planar surface, such that said first and second layers of magnetic materials and said gap layer are sandwiched between said first and second support layers.

17. The method of claim 12, wherein the step of providing a monocrystalline substrate includes providing a substrate comprising silicon.

18. The method of claim 12, wherein the step of depositing the first and second layers of magnetic materials includes depositing layers of alloys comprising iron, aluminum and silicon.

19. The method of claim 12, wherein the step of depositing a gap layer includes depositing a layer comprising silicon oxide.

20. The method of claim 12, further including forming a plurality of magnetic heads extending in a lengthwise direction of the gap layer, and wherein the plurality of heads can be machined in a same machining operation.

21. The method of claim 12, further including forming a plurality of magnetic heads having gap layers extending parallel to one another.

22. The method of claim 12, wherein the step of selectively chemically attacking includes forming an inclined face on a portion of said monocrystalline substrate not covered by said mask, and wherein the subsequent depositing of the first layer of magnetic material and depositing of said gap layer forms respective inclined portions of said first layer and said gap layer, and wherein the inclined portion of the tap layer forms the gap layer which desparated the first and second layers of magnetic material in the finished head.

* * * * *